Dec. 5, 1950     W. A. HIGINBOTHAM ET AL     2,532,549
AIRCRAFT RADAR-MAP ROLL CORRECTION SYSTEM
Filed July 9, 1945
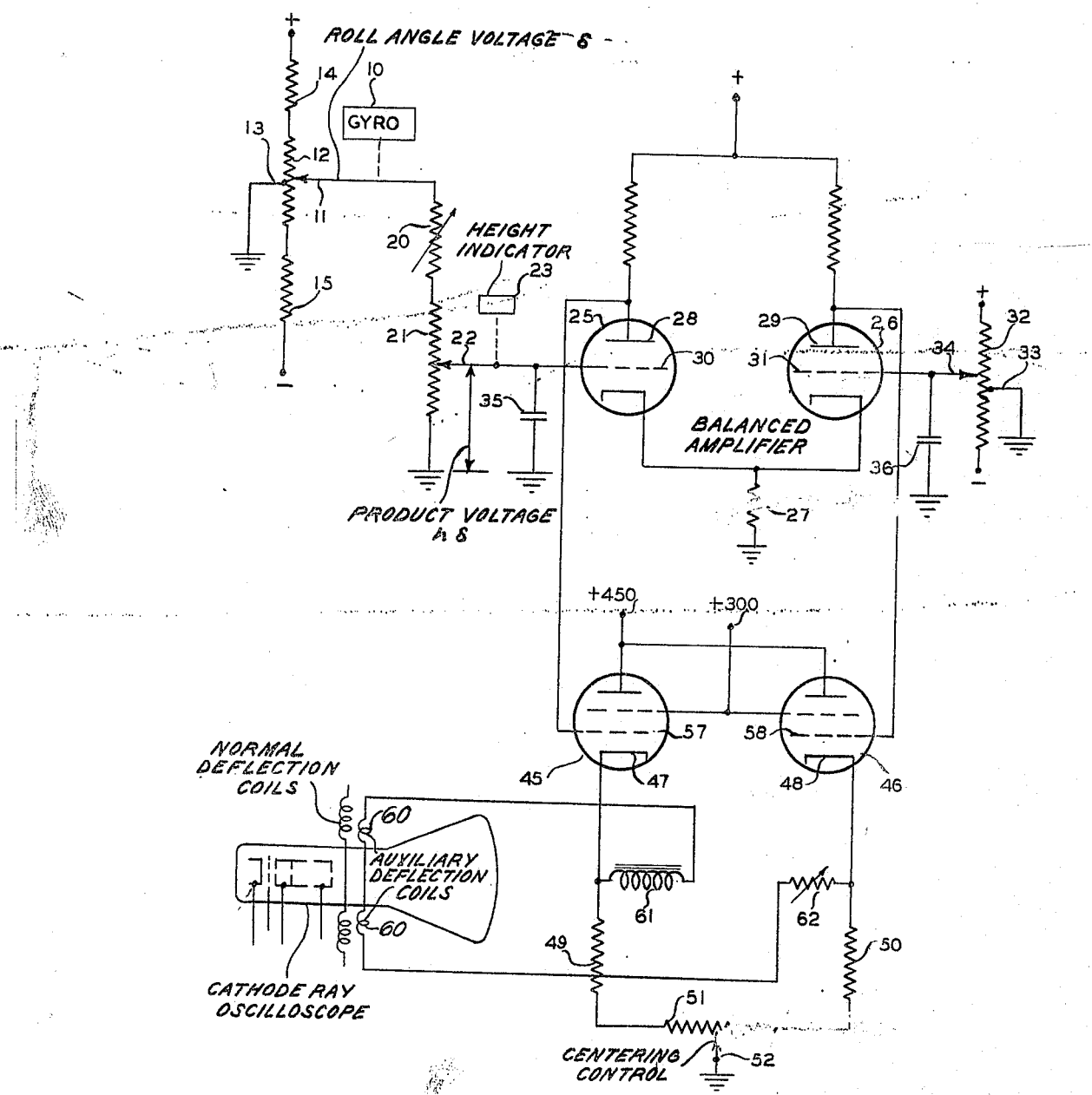
INVENTORS
WILLIAM A. HIGINBOTHAM
RAYMOND PEPINSKY
BY
William D. Hall
ATTORNEY

Patented Dec. 5, 1950

2,532,549

UNITED STATES PATENT OFFICE 2,532,549

AIRCRAFT RADAR-MAP ROLL CORRECTION SYSTEM

William A. Higinbotham, Sante Fe, N. Mex., and Raymond Pepinsky, Cambridge, Mass., assignors, by mesne assignments, to the United States of America as represented by the Secretary of War Application July 9, 1945, Serial No. 604,037

9 Claims. (Cl. 343—5)

This invention relates to an electrical apparatus, and more particularly to an airborne electrical apparatus for providing a continuously accurate plan view of a portion of the earth's surface (and objects thereon) underlying an aircraft in flight.

The apparatus here disclosed is particularly important and useful in connection with determination of the actual position of an aircraft, for it stabilizes a map-like display in the aircraft against distortion due to lateral roll movements of the said aircraft.

Electrical apparatus adapted for use on aircraft is known in the art which provides a map-like presentation of the land area over which the aircraft is flying. An example of such apparatus is described in the copending application of Luis W. Alvarez, Serial No. 542,287, filed June 27, 1944, now Patent No. 2,480,208. In this apparatus, here termed pulse-echo apparatus, a transmitter component produces rapidly recurring pulses of radio frequency energy which are applied to a scanning antenna and beamed to the earth below. The resulting reflections or "echoes" of various intensities are received by the same antenna and converted by a receiver and indicator (cathode ray tube) to a continuous map-like display of the area underlying the aircraft which carries the said apparatus.

The accuracy of the map-like display is normally dependent upon the attitude of the aircraft carrying the pulse-echo apparatus, and one use of the invention here disclosed is to continuously correct or adjust certain electrical conditions in the said apparatus to prevent inaccuracies and dynamic displacements in the display due to roll displacements of the said aircraft about its longitudinal axis.

Accordingly it is an object of the present invention to provide means for preventing distortion in a map-like display due to roll displacements of an aircraft carrying apparatus producing said display. The prevention of distortion due to roll of the aircraft is referred to herein as stabilization since the picture has the appearance of being unstable during roll.

The above and other objects in view will appear more fully from the following detailed description, accompanying drawings, and appended claims.

The single figure of the drawing is an electrical circuit of a stabilizing system embodying the present invention.

Referring now to the pulse-echo system described in the previously mentioned copending application, the area scanned by the antenna is reproduced as a map-like presentation on the screen of a cathode ray tube, upon which an origin and X and Y coordinate axes are defined. The X and Y coordinate axes correspond to X and Y reference lines in the scanned area as in a plan view thereof seen from the aircraft, the Y reference line extending in the direction of flight, and the X reference line being perpendicular thereto. The Y reference line may be considered as the trace or intersection between the scanned area and a vertical plane through the longitudinal axis of the aircraft. The origin corresponds to the aircraft location with respect to the scanned area, as seen from a point vertically above the aircraft.

The antenna scans alternately to the left and right of the Y reference line, and the scanning pattern of the presentation is produced by coordinated X and Y deflections of the cathode ray tube beam. The cathode ray tube may be of either the electrostatic or electromagnetic type, and a discussion of the two types and associated circuits may be found in chapter 5 ("Cathode Ray Tubes and Circuits") of Ultra-High-Frequency Techniques by Brainerd et al., published in 1942. The utilization of one type of tube in place of the other is understood by those skilled in the art, involving primarily minor circuit changes to ultimately provide either current or voltage variations, as desired.

For convenience and simplicity, the invention will be described in detail with respect to an electromagnetic type of cathode ray tube. This type of tube generally utilizes an X deflection coil and a Y deflection coil, each of which may be formed as a pair of windings for purposes of physical and electrical symmetry. An X sweep current in the X deflection coil produces a pulsating magnetic flux which periodically deflects the beam in a lateral or X direction, and a sweep current in the Y deflection coil causes deflection of the beam in a Y direction. These conventional coils are hereinafter termed principal deflection coils.

Referring to the pulse-echo system, the abscissa or lateral coordinate $x$ of any object P in the scanned area, with respect to the Y reference line, is given by the expression $x = r \sin a$ during level flight of the aircraft, where $r$ is the slant range, or the length of a range line from the aircraft to the object P. The scan angle $a$ is defined or measured with respect to a scan reference plane which is perpendicular to the lateral axis of the aircraft and thus, for any given object, the angle $a$ is measured between the scan reference plane and the range line of the object. In level flight this scan reference plane is coincident with a vertical plane through the longitudinal axis of the aircraft, and the angle between the said vertical plane and the range line of an object then coincides with the scan angle at which an echo from that object intensifies the cathode ray tube beam.

The cycles of sweep current for the principal X deflection coil of the cathode ray tube are initiated in synchronism with the radiant energy pulses, and the amplitude characteristic of each cycle of X sweep current is dependent upon the instantaneous value of scan angle $\alpha$. The X sweep current is of saw-tooth waveform, whose slope in any given cycle is automatically controlled to be proportional to the sine of the scan angle existing during that cycle. In this manner, the X deflection or screen-position of the cathode ray tube beam, at the instant of beam intensification in response to a received echo from an object P, under level flight conditions is proportional to the actual abscissa of the object. Under level flight conditions the object P is thereby delineated in true position upon the screen of the cathode ray tube.

Regardless of what the roll-attitude of the aircraft may be, it is the scan angle which normally determines the lateral coordinate of an object delineated upon the screen of the cathode ray tube, for the means which control the magnitude of the beam deflection in a lateral direction are coordinated with the scanning action of the antenna. When the lateral axis of the aircraft departs from a normally level attitude, the scan reference plane no longer coincides with the vertical plane; thus, a roll displacement of the aircraft introduces a roll angle between the said reference and vertical planes. The angle between the vertical plane and the range line of an object P under scanning action then differs from the scan angle $\alpha$ by a roll angle $\delta$, and the object P delineated upon the map-like presentation is then displaced from its true position relative to the coordinate axes.

The most confusing form of distortion in the map-like presentation of an airborne pulse-echo apparatus is that caused by lateral roll of the aircraft. Such displacements from the normal attitude of the aircraft severely affect the accuracy of the $x$ coordinates in the delineation of objects, as briefly described above. The subject invention provides a stabilization system whereby the $x$ coordinates of objects delineated upon a cathode ray tube screen correspond at all times to the actual $x$ coordinates of the objects in the scanned areas.

It can be shown that the lateral coordinate of an object under scanning action, in terms of slant range $r$, scan angle $\alpha$, roll angle $\delta$, and aircraft height $h$, is given by the equation $$x = r \sin \alpha \sec \delta + h \tan \delta$$

where $x$ is the actual lateral coordinate referred to the Y reference line. Since the roll angle $\delta$ is generally small, a conveniently practical and suitable approximation of the above equation is had by neglecting the factor sec $\delta$, and by placing the term $h \tan \delta$ in the substantially equivalent form $h\delta$, where $\delta$ is expressed in radians. The lateral coordinate of an object P under scanning action is then given by the expression $$x = r \sin \alpha + h\delta$$

and it is this expression which will be hereinafter referred to and which is utilized in the stabilization of the map-like presentation.

The beam's $x$ deflection, which normally (as when $\delta$ is zero) corresponds to the first term $r \sin \alpha$ of the expression for $x$, is, by the present invention, increased or decreased as necessary by an amount corresponding to the second term $h\delta$ during a roll displacement of the aircraft. The roll angle $\delta$ changes sign when the aircraft rolls from one side to the other, and the term $h\delta$, hereinafter termed the correction term, changes sign accordingly.

Referring now to the drawing, the illustrated embodiment of the invention includes a gyroscopic device 10 designed to produce mechanical displacements proportional to the angles of roll, and is mechanically connected (shown schematically) to impart the said displacements to the movable wiper arm 11 of a center-tapped potentiometer 12. Potentiometer 12 is uniformly wound, and its center-tap 13 is connected to a common reference point which may be the metal structure of the aircraft as is usual, here represented by the conventional ground symbol. The outer ends of potentiometer 12 are connected to the positive and negative terminals of a source of voltage through resistances 14 and 15, respectively, which are substantially equal and function to reduce or adjust the available voltage to a suitable value for application to potentiometer 12. Voltage sources are indicated on the drawing simply by the polarity of their terminals, it being understood that where a negative terminal of a voltage source is not shown, the said negative terminal is grounded.

Gyroscopic device 10, the voltage source, and the series resistance circuit including the potentiometer 12, coact to produce a potential at wiper arm 11 in accordance with the roll angle $\delta$. This potential is variable in accordance with lateral roll displacements of the aircraft, and at any instant its polarity and magnitude correspond to the direction and amplitude, respectively, of the roll displacement. A potential divider circuit, including a variable resistance 20 in series with a potentiometer 21, is connected between wiper arm 11 and ground. Wiper arm 22 of potentiometer 21 is adapted to be moved in accordance with the magnitude of the aircraft altitude $h$, and the potential at wiper arm 22 is thereby made proportional to the correction term $h\delta$.

The wiper arm 22 may be controlled manually, in accordance with indications of an altitude meter, since altitude variations may be relatively slow. However, it may be readily controlled automatically in response to altitude, and such an automatic control is indicated schematically by block 23.

The correction term voltage at wiper arm 22 is in the illustrated embodiment applied to an amplifier which operates linearly and produces push-pull driving voltages. The voltage amplifier includes two tubes which may be of triode type as shown at 25 and 26, having their cathodes connected to one end of a common cathode resistance 27, the other end of resistance 27 being grounded. Plates 28 and 29 of tubes 25 and 26, respectively, are connected through substantially equal load resistances to the positive terminal of a suitable potential source, and it is at these plates that the driving voltages are developed. The correction term voltage at wiper arm 22 is applied to control grid 30 of tube 25, and control grid 31 of tube 26 is adjustably biased for purposes which will appear hereinafter. The biasing circuit for control grid 31 includes a center-tapped potentiometer 32 whose outer ends are connected to the positive and negative terminals of a suitable voltage source. Center-tap 33 of potentiometer 32 is grounded, and wiper arm 34 communicates with the control grid 31. Either a positive or negative potential may thus be applied to control grid 31 as necessary for adjustment of the circuit.

Although, as shown here, the midpoints of potentiometers 12 and 32 are grounded, it will be understood that alternative connections may be used if desired. For example, the midpoints of the associated sources of potential may be grounded.

Due to the common cathode resistance 27, a voltage of given polarity applied to control grid 30, resulting in a change of potential between control grid 30 and the cathodes, causes a potential change of substantially equal magnitude and opposite polarity between control grid 31 and the cathodes. A correction term voltage applied to control grid 30 thereby produces push-pull changes in potentials at the plates of tubes 25 and 26, and because of the linear operation of the circuit the said push-pull potential changes are proportional to the correction term. The normal potentials at the plates of tubes 25 and 26, corresponding to zero voltage applied to control grid 30, are determined in similar fashion by the adjustable bias applied to control grid 31, and the normal plate potentials may therefore be made either equal or different in magnitude as desired, for purposes which will appear. Control grids 30 and 31 are connected to ground through capacitances 35 and 36, respectively, and the impedance of the paths between the said control grids and ground are thus sufficiently low to secure satisfactory operation of the circuit as a push-pull amplifier. The capacitances 35 and 36 also serve to prevent the occurrence of rapid variations of voltage at control grids 30 and 31, respectively, such as might take place due to electrical pickup from neighboring components or due to vibrational movements in the apparatus which tend to affect the voltage at the said control grids.

The voltages developed at plates 28 and 29 of the voltage amplifier tubes are applied to the control grids of a push-pull coupling stage of cathode follower type. The cathode follower stage includes two tubes 45 and 46 which may be of the beam power type and are hereinafter termed driver tubes. Positive potentials here shown having representative values of 300 and 450 volts are applied to the screen grids and plates, respectively, of the driver tubes. For biasing and gain-adjusting purposes, cathodes 47 and 48 of driver tubes 45 and 46 are connected to substantially equal resistances 49 and 50, respectively, the other ends of the said resistances being connected to a gain-matching potentiometer 51 whose wiper arm 52 is grounded. By proper adjustment of wiper arm 52, the dynamic characteristics of the driver tubes may be equalized so that distortion-free operation may be had over an optimum range.

The cathode follower stage functions to drive a current through a deflection-stabilizing coil 60 which cooperates with the principal X deflection coil to stabilize the lateral deflection of the beam. The deflection-stabilizing coil 60 may physically be a pair of windings which are mounted contiguously with the principal X deflection windings upon the cathode ray tube. Deflection-stabilizing coil 60, an inductance 61 and a variable resistance 62, are connected serially between cathodes 47 and 48. The voltages at cathodes 47 and 48 (except as indicated hereinafter), are substantially equal when the correction term $h\delta$ is zero, so that the voltage difference between cathode 47 and cathode 48 is substantially zero. When roll displacements of the aircraft take place, the resulting push-pull potential changes at the plates and control grids of the voltage amplifier and cathode follower, respectively, cause push-pull voltage differences between cathodes 47 and 48, proportional in amplitude and direction to the product of aircraft height $h$ and roll angle $\delta$, that is to the correction term $h\delta$. Since the operation of the cathode follower stage is linear, the resulting current change through deflection-stabilizing coil 60 and the magnetic flux produced thereby are proportional to the correction term voltage which is linearly amplified in the push-pull voltage amplifier.

Potentiometer 32 serves to adjust the circuits for proper positioning of the cathode ray tube beam. Wiper arm 34 of potentiometer 32 may be set in such position that when the voltage at control grid 30 is zero, corresponding to a zero roll angle, the current through deflection-stabilization coil 60 is zero. This adjustment of the potential at control grid 31 compensates for inequalities in the static characteristics of both the voltage amplifier tubes and the cathode follower tubes, for the said adjustment controls the normal potentials at plates 28 and 29, and in turn controls the potentials at cathodes 47 and 48. It may be that due to inaccuracies in the structure of the cathode ray tube and deflection coils, the presentation is improperly positioned when the current through the deflection-stabilization coil 60 is zero. This condition may be remedied by a centering current through the said deflection-stabilization coil. Thus, wiper arm 34 may be so set that the potentials at cathodes 47 and 48 have such values, during level flight of the aircraft, that the current through the deflection-stabilizing coil 60 has the proper magnitude and direction to accurately position the presentation in a lateral direction with respect to the Y coordinate axis. This adjustment of potentiometer 32 does not affect the operation of the circuit for automatic stabilization of the presentation, for the accuracy of the said stabilization is determined primarily by the separately-adjusted dynamic characteristics of the tube circuits.

Variable resistances 20 and 62 function to adjust the proportionality factor between the current variation in deflection-stabilization coil 60 and the correction term variation, resistance 62 serving primarily for small adjustments of this factor, and resistance 20 serving for major adjustments in accordance with the desired scale of the map-like presentation which the pulse-echo apparatus produces. Thus, the proportionality factor between the correction term variation and the current change in the deflection-stabilization coil 60 may be adjusted to the value necessary for increase or decrease of the normal X deflections of the beam by the proper amounts.

Referring again to the pulse-echo apparatus, a roll displacement of the aircraft in a clockwise direction, as seen by the pilot, normally shifts the instantaneous screen-positions of the beam to the right of the corresponding positions necessary for an accurate presentation. Similarly, a counter-clockwise roll of the aircraft from its level-flight attitude normally shifts the said screen-positions of the beam to the left of the corresponding true positions. These shifts are counteracted and the presentation is stabilized by the present invention as typified by the embodiment here described. Thus, when the voltage at control grid 30 becomes positive, in accordance with a roll displacement of the aircraft here selected to be clockwise for consistency of description, the potentials at plate 28, control grid 57, and cathode 47, become lower than the values existing at these tube elements during level flight of the aircraft. Because of the push-pull action of the tube circuits here described, the potentials at plate 29, control grid 58, and cathode 48, simultaneously become higher than their normal values. The resultant current through deflection-stabilization coil 60 is in such direction (controlled by proper polarization of the coil terminals) as to compensatingly shift the instantaneous screen-positions of the beam toward the left and thus secure presentation stabilization for a clockwise roll. Similarly, a negative potential which occurs at control grid 30 in accordance with a counter-clockwise roll causes a current through the deflection-stabilization coil in a reverse direction, as is necessary for presentation stabilization during a counter-clockwise roll.

A high-frequency voltage is induced in deflection-stabilization coil 60 by correspondingly rapid variations of current in the principal X deflection coil. Interfering currents in the deflection-stabilization coil are held to a negligible value by the series inductance 61, whose impedance value is large at the said high frequency of the induced voltage. The frequency of variation of the correction term voltages which are amplified and applied to the deflection-stabilization coil circuit is relatively small, so that inductance 61 contributes a negligibly low impedance to the desired voltage variations in the deflection-stabilization coil circuit. Satisfactory operation of the cathode ray tube and associated circuits is thereby insured despite the necessarily close coupling between the principal X deflection coil and the deflection-stabilization coil 60.

It will be understood that the specific embodiment of the invention shown and described is but illustrative and that various modifications may be made therein without departing from the scope and spirit of the invention.

What is claimed is:

1. In a radio pulse-echo device for an airplane adapted to form a map-like representation of reflecting objects on the earth's surface on the screen of a cathode ray oscilloscope, means for neutralizing the distortion arising in said map-like representation due to roll of the airplane about its longitudinal axis comprising, a gyroscope and a first potentiometer positioned by said gyroscope, a height indicator and a second potentiometer positioned by said indicator, a source of constant potential connected across first potentiometer and a connection from the arm of first potentiometer to one end of second potentiometer whereby the output voltage of second potentiometer is proportional to the product of roll angle and height, an amplifier for amplifying said product voltage including a first pair of tubes, each having at least a cathode, control grid and plate, a source of plate potential, impedances connecting said plates to said potential source, a connection from the arm of second potentiometer to one of said control grids, a common impedance connecting said cathodes to said potential source terminal, whereby push-pull variation of voltage is developed at said plates, connections between each of said plates and the respective grids of a push-pull current amplifier, said current amplifier having output terminals connected to the respective cathodes and being adapted to produce a current in auxiliary deflecting coils on the the cathode ray oscilloscope connected between said output terminals, said current varying in accordance with the aforesaid product voltage, the other of said control grids of said first pair of tubes being adjustably biased with respect to said fixed potential terminal, whereby the normal current through said circuit is adjustable to a selected value.

2. In an electronic indicator for an airplane including a cathode ray tube having principal deflection means associated therewith, said tube having a cathode ray beam positioned in accordance with sweep voltages applied to said principal deflection means, means responsive to the axial roll of the airplane and adapted to produce a voltage proportional thereto, said means including a first potential divider positioned by a gyroscope in accordance with the angle of roll and having input and output terminals, a source of constant potential connected across the first potential divider, a second potential divider positioned by a height indicator and connected to the output terminals of first potential divider, whereby there is produced at output terminals of second voltage divider a resultant voltage proportional to the product of roll angle and height, auxiliary deflection coils associated with the principal deflection coils of said cathode ray tube, and amplifier means for applying the said product voltage to said auxiliary deflection coils, whereby the positions of the cathode ray beam are corrected for distortion errors due to roll and height.

3. In an airborne pulse-echo apparatus which scans an underlying area and produces a map-like presentation thereof upon the screen of a cathode ray tube, said cathode ray tube having principal deflection means associated therewith whereby the cathode ray beam is deflected in coordination with the scanning action of a radio beam, points on said map-like presentation being disposed with respect to coordinate axes on the ground formed by projection of vertical planes through the longitudinal and lateral axes of the airplane during normal flying attitude, means for compensating the distortion in said map-like presentation arising from roll of the airplane about its longitudinal axis including means for producing a correction voltage which varies in accordance with the product of height of said aircraft and the angle of roll, and means for applying the said correction voltage to the lateral deflecting system of the cathode ray tube, said applying means including a balanced amplifier comprising a first pair of tubes each having at least a cathode, an anode, and a control grid, impedances connecting said anodes to a fixed potential source, a connection between one of the control grids and said correction voltage means, the other control grid being connected to an adjustable source of grid bias potential, a second pair of amplifier tubes in push-pull relation having control grids connected conductively to the respective anodes of first pair of tubes, the cathodes being individually connected to ground through separate impedances and output connections from the cathodes to a magnet coil cooperatively related to the aforesaid principal deflecting means of the cathode ray tube.

4. In an electronic indicator for an airplane including a cathode ray tube having principal deflection means associated therewith, said tube having a cathode ray beam positioned in accordance with sweep voltages applied to said principal deflection means; means for producing a correction voltage, proportional to the product of height and angle of roll of the airplane about its longitudinal axis; auxiliary deflection means associated with said cathode ray tube, and means for applying the said correction voltage to said auxiliary deflection means, said correction voltage producing means including first and second potentiometers, first potentiometer energized across a constant potential source and having its mid-point grounded, a gyroscope adapted to position first potentiometer arm in response to roll of the airplane, a height indicator adapted to position second potentiometer arm in response to height, a connection from first potentiometer arm to one end of second potentiometer the other end being grounded, said correction voltage applying means including a balanced direct coupled amplifier having first and second pairs of amplifier tubes, one grid of first amplifier connected to the arm of second potentiometer, the other grid being connected to an adjustable source of bias potential, grids of second amplifier connected conductively to respective anodes of first amplifier, cathodes of second amplifier having individual resistors connected to the ends of a potentiometer the arm of which is grounded, and a cathode to cathode circuit including an inductance, an adjustable resistance and an auxiliary deflecting coil cooperatively associated with said principal cathode ray deflecting coil.

5. In a radio pulse-echo device for an airplane adapted to form a map-like representation of reflecting objects on the earth's surface on the screen of a cathode ray oscilloscope, the combination with such oscilloscope having lateral deflecting coils, of means for reducing distortion of objects shown on the screen due to roll of the airplane about its longitudinal axis, said means including two potentiometers, a gyroscope connected to the first potentiometer arm to position said arm in response to the roll, a height indicator connected to the second potentiometer arm to move said arm in response to height, a source of constant potential connected across first potentiometer, a connection from one end of second potentiometer to the arm of first potentiometer, whereby the output voltage of second potentiometer is proportional to the product of the roll angle and height, an amplifier connected to the output of said second potentiometer for amplifying said product voltage and an output coil connected to said amplifier whose magnetic field is superposed on that of the lateral deflecting coils of the cathode ray oscilloscope whereby the distortion in said map-like representation is compensated.

6. In a radio pulse-echo device for an airplane adapted to form a map-like representation of reflecting objects on the earth's surface on the screen of a cathode ray oscilloscope having lateral deflecting means, means for reducing distortion of objects shown on the screen due to roll of the airplane about its longitudinal axis, said means including a first potentiometer connected across a fixed potential source with mid-point grounded, and a second potentiometer one end of which is connected to the arm of first potentiometer and the other end to ground, a gyroscope connected to the arm of first potentiometer to position said arm in response to roll, a height indicator connected to the arm of second potentiometer to position said arm in response to height whereby the output voltage of second potentiometer is proportional to the product of roll angle and height, a direct coupled balanced amplifier connected to second potentiometer output, and a magnet coil in cooperative relation with the lateral deflecting means of the cathode ray oscilloscope connected to said amplifier output, whereby a compensating field proportional to said product voltage is superposed on the normal deflecting field to neutralize distortion due to roll.

7. In a radio pulse-echo device for an airplane adapted to form a map-like representation of reflecting objects on the earth's surface on the screen of a cathode ray oscilloscope, means for reducing distortion of objects shown on the screen due to roll of the airplane about its longitudinal axis, said means including a first potentiometer connected across a fixed potential source with mid-point grounded, and a second potentiometer one end of which is connected to the arm of first potentiometer and the other end to ground, a gyroscope connected to the arm of first potentiometer to position said arm in response to roll, a height indicator connected to the arm of second potentiometer to position said arm in response to height, whereby the output voltage of second potentiometer is proportional to the product of roll angle and height, a direct coupled balanced amplifier connected to the output of said second potentiometer, a magnet coil in cooperative relation with the lateral deflecting coils of said cathode ray oscilloscope connected to said amplifier output, said balanced amplifier comprising a first pair of tubes each having at least a cathode, an anode and a control grid, impedances connecting said anodes to a fixed potential source, a common impedance connecting said cathodes to ground, the other control grid being connected to an adjustable source of grid bias potential, a second pair of amplifier tubes in push-pull relation having control grids conductively connected to the respective anodes of first pair of tubes and cathodes connected to ground through separate impedances, and output connections from the cathodes to aforesaid magnet coil, whereby a compensating field proportional to said product voltage is superposed on the normal deflecting field to neutralize distortion due to roll.

8. In a radio pulse-echo device for an airplane adapted to form a map-like representation of reflecting objects on the earth's surface on the screen of a cathode ray oscilloscope, means for neutralizing the distortion arising in said map-like representation due to roll of the airplane about its longitudinal axis comprising, means for producing a voltage proportional to the product of the angle of roll and height of the aircraft and means for applying said product voltage as a correction to the normal deflecting system of the cathode ray oscilloscope, said product voltage means including, a gyroscope and a first potentiometer positioned by said gyroscope in accordance with the angle of roll, a height indicator and a second potentiometer positioned in accordance with height, a source of constant potential connected across first potentiometer, and a connection from the arm of first potentiometer to one end of second potentiometer whereby the output voltage of second potentiometer is proportional to the product of the angle of roll and height, said applying means including an amplifier connected to the output of second potentiometer for amplifying said product voltage, auxiliary deflecting coils mounted on said cathode ray oscilloscope and disposed to cooperate magnetically with one set of normal deflecting coils, and a connection from the amplifier output to said auxiliary deflecting coils whereby the aforesaid roll distortion is compensated.

9. In a radio pulse-echo device carried on aircraft and adapted to form a map-like representation of the underlying surface of the earth on the face of a cathode ray oscilloscope, means for neutralizing the distortion arising in said map-like representation due to roll of the aircraft about its longitudinal axis comprising, means for producing a voltage proportional to the product of the angle of roll and the height above ground, means for amplifying said product voltage, and means for applying the output of said amplifier to that deflecting system of the cathode ray oscilloscope experiencing distortion due to roll, said product voltage means comprising a first potentiometer positioned by a gyroscope, a second potentiometer positioned by a height indicator, a source of constant potential connected across the first potentiometer, and a connection from the arm of the first potentiometer to one end of the second potentiometer, said applying means including auxiliary deflecting coils mounted on said oscilloscope and disposed to cooperate magnetically with one set of normal deflecting coils, and a connection from the output of said amplifying means to said auxiliary coils whereby distortion due to roll is compensated.

WILLIAM A. HIGINBOTHAM.
RAYMOND PEPINSKY.

REFERENCES CITED

The following references are of record in the file of this patent:

UNITED STATES PATENTS

| Number | Name | Date |
|---|---|---|
| 2,114,283 | Anderson | Apr. 19, 1938 |
| 2,208,379 | Luck | July 16, 1940 |
| 2,209,191 | Dearing | July 23, 1940 |
| 2,240,635 | Avins | May 6, 1941 |
| 2,278,641 | Bond | Apr. 7, 1942 |
| 2,421,747 | Engelhardt | June 10, 1947 |
| 2,480,208 | Alvarez | Aug. 30, 1949 |

FOREIGN PATENTS

| Number | Country | Date |
|---|---|---|
| 497,761 | Great Britain | Dec. 28, 1938 |